June 2, 1936.  B. C. PLACE  2,043,007
FASTENER
Filed Aug. 28, 1930
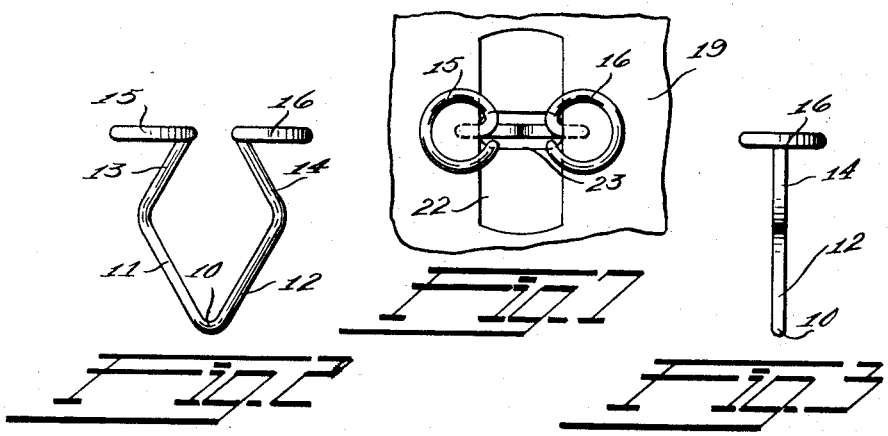
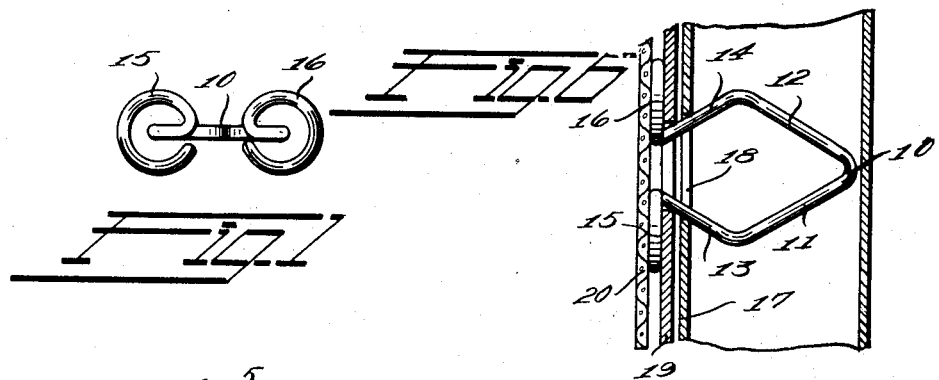
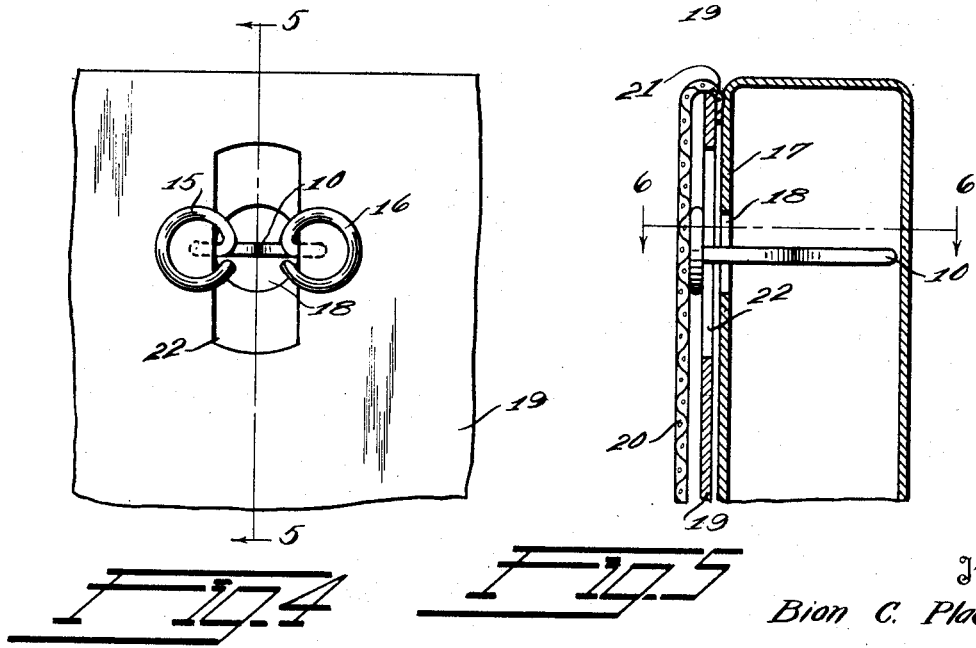
Inventor
Bion C. Place
By
Strauch & Hoffman
Attorneys Patented June 2, 1936

2,043,007

UNITED STATES PATENT OFFICE 2,043,007

FASTENER

Bion C. Place, Detroit, Mich., assignor of one-half to George E. Gagnier, Detroit, Mich.

Application August 28, 1930, Serial No. 478,411

6 Claims. (Cl. 24—215)

This invention relates to fasteners, particularly of the one-piece wire spring type.

The fastener of this invention is intended for use particularly in securing trim or finish panels to the interior of automobile bodies, although the fastener is capable of being put to many other uses, especially in situations in which the rear of the supporting structure to which material is attached by means of a fastener is inaccessible for the application of nuts, cotter-pins, etc., and in which the material is to be yieldably held to said supporting structure by the fasteners.

An object of the invention is to provide a one-piece wire fastener of the spring type, formed by bending the wire between its ends to provide the spring holding portions of the fastener and by bending the ends thereof to form two head sections, which fastener may be manufactured at an extremely low cost.

A further object of the invention is to provide a one-piece fastener including a resilient shank and head sections, the overall transverse dimension of which in one direction is substantially greater than the overall transverse dimension in direction at right angles to said first direction so that the fastener may be applied to the body or foundation of a trim panel, after the covering of the outer face thereof has been applied thereto, by inserting said head in an elongated slot of regular form and turning the fastener through an angle of 90 degrees, after the head has been inserted in said slot so that the major dimension of the head sections then extend across the slot.

A still further object of the invention is to provide a one-piece wire spring fastener having a pair of head sections arranged in substantial spaced relation so as to widely distribute the yielding pressure on the material secured by the fastener over substantial areas at each side of the opening traversed by the shank of the fastener.

A still further object of the invention is to provide a spring fastener, of the type that includes a yieldable shank, portions of which diverge from the point of the fastener, that first enters the opening or socket provided to receive it, in which the spring portions of the shank of the fastener flex with respect to said point, whereby a relatively great leverage is provided between the point at which flexure occurs and the point of bearing of the head or head sections of the fastener on the material secured thereby.

Still another object of the invention is to provide a one-piece wire fastener in which the ends of the fastener are bent to provide separate head sections, and in which the mid-portion of the wire is bent into a form to provide converging guiding portions, and diverging holding portions which portions are integrally connected together at the end of the shank of the fastener.

A further object of the invention is to provide an improved manner of manufacturing fasteners of tempered wire having a high degree of stiffness combined with sufficient resilience so that the covering material is yieldably but firmly maintained in position on its supporting structure.

Further objects of the invention will appear as a description thereof proceeds with reference to the accompanying drawing in which—

Figures 1, 2, and 3 are respectively, plan, side and end elevations of a preferred form of fastener embodying this invention.

Figure 4 is a fragmentary side elevation of a trim panel for an automobile body held in position by one of said fasteners, the outer covering fabric being omitted to expose the fastener and the underlying construction.

Figure 5 is a sectional view taken in the plane indicated by the line 5—5 in Figure 4 with the fabric cover in position.

Figure 6 is a horizontal sectional view taken on the plane indicated by the line 6—6 of Figure 5.

Figure 7 is a view similar to Figure 4 but showing a modified arrangement.

Like reference characters indicate like parts throughout the several figures.

The fastener of this invention is preferably formed from a single piece of wire bent to provide a resilient shank extending normally to a head, consisting of two parts or sections, each part being formed from an end of the wire, the mid-portion of which is bent to form said shank of the fastener.

In order to form the fastener, the wire is bent at approximately its middle portion, providing a rounded nose portion 10. From said nose portion the wire is bowed outwardly providing divergently formed portions 11 and 12 that serve to guide the fastener in the opening of the supporting structure, which portions are hereinafter termed guiding portions. The portions of the bowed wire adjacent the guiding portions converge and provide holding portions 13 and 14. The ends of the wire are then bent in opposite directions into planes at right angles to the planes of the shank of the fastener formed in the manner just described, providing spaced head sections 15 and 16. Preferably, each of the head sections 15 and 16 is of circular form, although it will be readily understood that it may assume any desired configuration, the circular form being preferred because it is unnecessary in making such sections, to bend the wire sharply at any point. While wire having a substantial thickness in the direction of flexure is preferred, the fastener may be formed of any strip of material capable of being effectively fabricated into the indicated form.

It will be observed that the head sections 15 and 16 are spaced relatively widely apart so as to be capable of freely moving toward and from each other on the panel, and that the head section 15 is resiliently carried by the portions of the wire consisting of the guiding portion 11 and the holding portion 13, while the head section 16 is carried resiliently by the portion of the wire including the guiding portion 12 and the holding portion 14, and that when said head sections are brought toward each other the wire flexes at the return bend, that has resulted in the nose 10 before referred to.

A fastener is thus provided having relatively widely spaced head sections, each of which is supported by an arm flexing at a point that is spaced substantially inwardly from the head sections, thus providing a relatively long arm for the support of each of said sections. This arrangement results in a fastener having a high degree of resilience, and said arms accordingly serve to yieldingly press the material secured by the fastener against the supporting structure.

One manner of use of the fastener is illustrated in Figs. 4, 5 and 6 of the drawing, which shows the fastener applied for the purpose of securing a trim panel to the supporting structure of an automobile body. The supporting structure 17, may be part of the inside of the metallic framework of an automobile door, for example, or any other part. In order to secure the trim panel thereto by means of the fastener of the present invention, it is only necessary to form openings 18 in the supporting structure. Such openings are formed, as will be readily understood, at intervals along the portions of the supporting structure opposite to the edges of the panels, that are to be applied thereto so that the fasteners are arranged at relatively closely spaced intervals around the periphery of the panels.

Trim panels, as generally used for finishing automobile bodies comprise a body 19 of fibrous or similar material and a fabric cover 20 for the outer or exposed surface of the body of the panel. Such fabric cover is wrapped around the edges of the body 19, as illustrated at 21, and it is desirable to be able to apply the fastener after the covering material has been applied thereto. This makes it necessary to apply the fastener from the rear or uncovered face of the panel body. To enable this to be done the body 19 is provided with elongated slots 22, having a length corresponding approximately to the major dimension of the head sections and of a width corresponding to the minor transverse dimension of the head of the fastener.

In applying a trim panel to the interior of an automobile body, by means of the fasteners of this application, the panel is provided with a fabric covering and with elongated openings 22 at regularly spaced intervals adjacent the periphery thereof. The improved fasteners are then inserted in the elongated slots 22 by moving the heads through said slots from the rear of the body of the panel, and after the heads are disposed between the fabric 20 and the outer face of the body 19 the fasteners are turned through 90 degrees to the position indicated in Fig. 4 of the drawing. In this position the head sections 15 and 16 bear upon substantial areas of the body of the panel at both sides of the slot 22.

After the fasteners have been assembled with respect to the panels as just described, the panels are applied to the supporting structure by bringing the noses 10 of each of the fasteners opposite the openings 18 in the supporting structure and applying pressure to force the shanks of the fasteners through said openings 18. The diameter of the openings 18 is less than the major transverse dimension of the shank of the fastener, and when such pressure is applied the guiding portions 11 and 12 as they move through the openings cause the head sections to approach each other, sufficient clearance being always provided between said head sections to permit the fastener to enter the openings 18. After the widest portion of the fastener has been sufficiently contracted to permit the passage of this portion of the shank of the fastener, the holding portions 13 and 14 spring apart engaging the side walls of the opening and serving to draw the material toward the supporting structure by means of a resilient wedging action. Inasmuch as in contracting the fastener, the flexure between the two arms of the shank of the fastener takes place at the point 10, it will be understood that the resilient pressure is applied to the panel by means of the relatively long spring arms extending from said point, as above pointed out. It will be observed that the length of the holding portions is many times greater than the thickness of the wall of the supporting structure, so that the fastener will be effective though the fastener receiving openings be formed at points where two thicknesses of metal, constituting the supporting structure, overlap, for example, or with walls of widely varying thicknesses.

In applying trim panels to the supporting structure of an automobile body it sometimes appears that the opening 18 in the supporting structure is not in exactly the desired position. If the opening should be slightly above or below its proper position, it will be readily understood that the fastener can be slid along the length of the elongated slot 22. If the opening 18 is slightly to one side of its correct position, the fastener of this invention will nevertheless serve to firmly hold the covering material in proper position because of the fact that it is capable of substantial lateral contraction that would automatically compensate for any improper positioning of the opening 18 to the degree that occurs in practice. It will be observed further that the thickness of the strip of which the fastener is made is materially less than the diameter of the opening in the supporting structure so that the shank of the fastener does not completely fill said opening. In view of this fact, variations form exact alinement between the shank of the fastener and the opening in the supporting structure can occur without substantial loss in the efficiency of the fastener.

It is accordingly unnecessary, with the present invention, to provide a fastener that is free to move in all directions and it is preferred to have the holding portions 13 and 14 when the fastener has been shifted to the proper position engage the side walls of the slot 22, and so that the fastener is held frictionally in position at all times.

If desired, the modified arrangement shown in Figure 7 may be employed. In this form of the invention the frictional engagement of the holding portions 13 and 14 with the sides of the slot 22 and the wall of the opening 22 need not be relied upon to maintain the fastener in the position in which the head sections rest on the portions of the panel opposite said sides. To prevent all possibility of rotation of the fastener from its proper operative position, the supporting structure 17 may be provided with an elongated slot 23 whose major dimension extends in a direction at right angles to the major dimensions of the slot 22. This arrangement precludes the turning of the fastener in the direction necessary to detach it from the panel after the assembly of the panel and supporting structure has been effected.

In order to produce a fastener having the degree of stiffness essential to serve the purpose just described, I have found that it is desirable to avoid tempering the wire of which the fastener is made until after it has been bent into the completed form. I have found that tempered wire having the degree of stiffness necessary to use in practice for the above purpose, cannot be bent into the desired form without rupture of the wire, or at least without seriously weakening it at the point at which it is essential that it have the greatest strength. The fastener above mentioned accordingly is formed from soft wire. The wire is bent, while in this condition into the form of the fastener. This may be readily accomplished by machine. After the fastener has been formed, it is then tempered in any desired manner, giving it the necessary hardness and stiffness essential to the purposes which it must serve. The tempering may be brought about by heating the fastener that has been bent into a completed form to a white heat, and then submerging the fastener into a bath of oil of the kind that is used in such tempering operations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. A metallic spring stud fastener complete in itself for securing a perforated panel to a supporting structure and capable of resilient expansion and contraction in entering an aperture in a wall of the supporting structure, formed from a single elongated strip of relatively stiff metal of a width materially less than the diameter of said aperture by bending the intermediate portions thereof on lines transverse to the length of said strip to form a resilient shank having a nose and two outwardly bowed legs, and by bending the ends to form separated head sections capable of free movement toward and from each other upon contraction and expansion of said shank, said head sections being disposed in planes substantially at right angles to the length of the shank, said legs between said head sections and the point of maximum outward bowing converging throughout a distance many times the normal thickness of said wall of said supporting structure so that the fastener is adapted to hold panels to walls of varying thicknesses with a continuously effective yielding pressure.

2. A metallic spring stud fastener complete in itself and capable of resilient contraction in entering an aperture in a wall of a supporting structure and formed from a single piece of relatively stiff wire by return bending the mid-portion thereof to form a resilient shank consisting of a nose and two legs having outwardly bowed portions and by bending the ends to form separate head sections, each in the form of a substantially closed loop and arranged substantially at right angles to the length of the shank.

3. A metallic spring stud fastener complete in itself for securing a perforated panel to a supporting structure and capable of contraction and expansion in entering an aperture in a wall of the supporting structure, consisting of spaced head sections shaped to bear upon the panel with freedom to move toward or from each other upon contraction or expansion of said fastener, and a shank consisting of a single strip of metal of a width materially less than the diameter of said aperture and connecting said head sections and doubled to provide a pair of legs terminating in a nose to enter said aperture in said supporting structure, each of said legs being bent to provide inclined portions of a length many times the normal thickness of said supporting structure so that the fastener is adapted to hold panels to walls of varying thicknesses with a continuously effective yielding pressure, said nose providing the point of flexure when the shank contracts or expands in entering said aperture.

4. A one-piece wire spring stud fastener complete in itself and capable of contraction in entering an aperture in a wall of a supporting structure and consisting of two spaced head sections each in the form of a substantially closed loop, and a shank connecting said head sections and projecting substantially at right angles to said sections, said shank being formed by substantially doubling the mid-portion of said piece of wire to provide a pair of connected legs separated from each other and to provide means to hold the fastener engaged in said aperture, each leg carrying one of said head sections.

5. A spring stud fastener complete in itself for securing a perforated panel to a supporting structure and capable of contraction and expansion in entering an aperture in a wall of the supporting structure, consisting of two separated head sections disposed in spaced relation in the same plane and shaped to bear upon the panel with freedom to move toward or from each other upon contraction and expansion of said fastener, a shank in the form of an elongated loop shaped to resiliently unite said head sections, said loop being disposed in a plane substantially normal to said head sections and provided with oppositely inclined portions to yieldingly engage the wall defining said aperture provided to receive said shank to prevent ready withdrawal thereof, said inclined portions being of a length many times the normal thickness of said wall of said supporting structure whereby said fastener is adapted to hold panels to walls of varying thicknesses with a continuously effective yielding pressure.

6. A one-piece metal spring stud fastener complete in itself for securing a perforated panel to a supporting structure and capable of contraction and expansion in entering an aperture in a wall of the supporting structure, consisting of two head sections, said head sections being disposed in spaced relation in substantially the same plane and shaped to bear upon the panel with freedom to move toward or from each other upon contraction and expansion of said fastener, a shank formed by return bending the mid-portion of said piece of metal and serving to resiliently unite said head sections, said portion of the metal being bowed outwardly between the return bend and said sections to provide divergent and convergent portions, the latter having a length many times the normal thickness of the wall of said supporting structure to yieldingly engage the wall defining said aperture, the divergent portions adjacent to said bend serving to guide said fastener into said aperture, while the convergent portions adjacent the head sections serve to hold the fastener yieldingly in such aperture irrespective of the thickness of the wall of said supporting structure.

BION C. PLACE